Nov. 12, 1929.　　　J. G. CAPSTAFF　　　1,735,155

MOTION PICTURE PROJECTOR

Original Filed Feb. 20, 1925　　2 Sheets-Sheet 1

Inventor,
John G. Capstaff,
By R. L. Stutchfield
N. M. Perrins
Attorneys

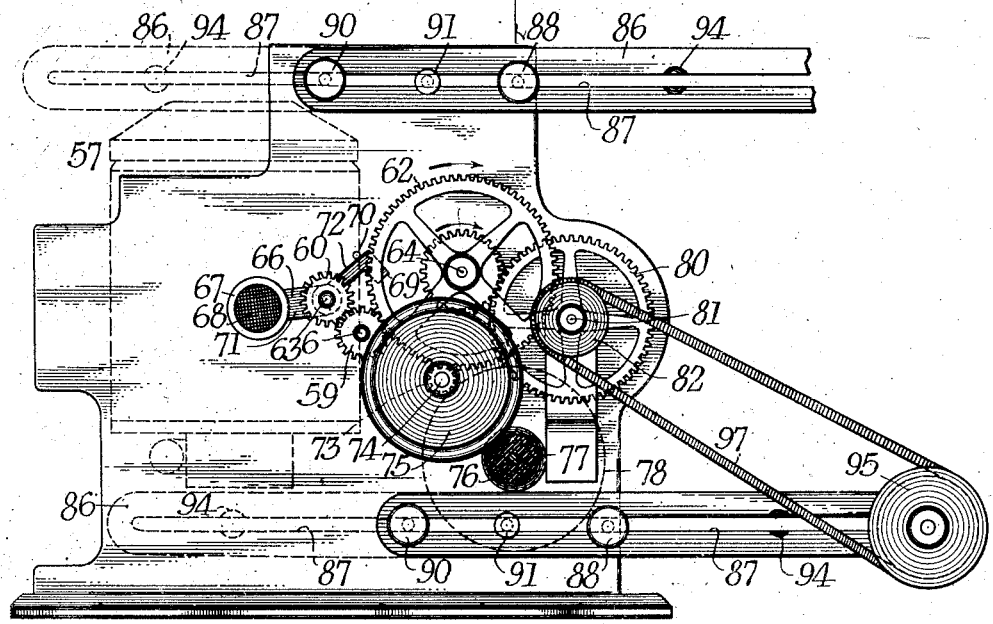
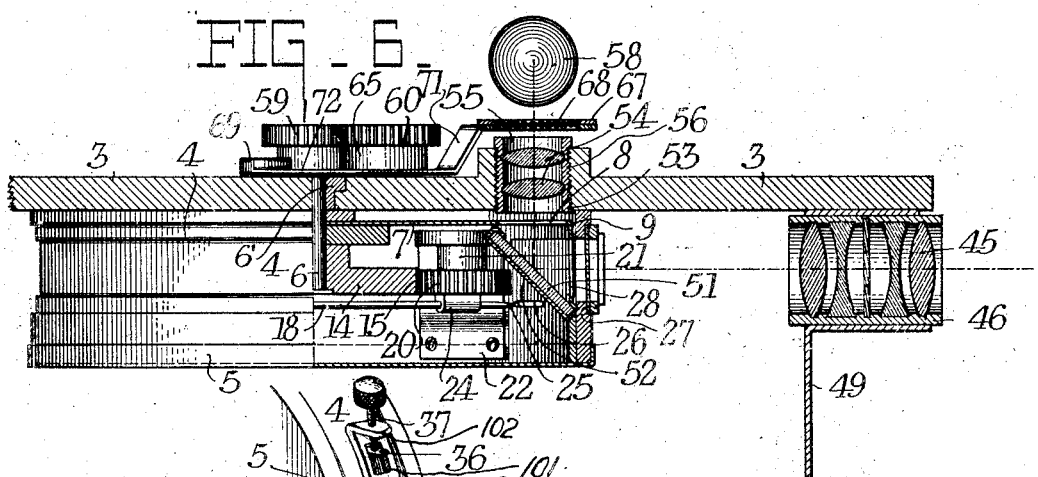
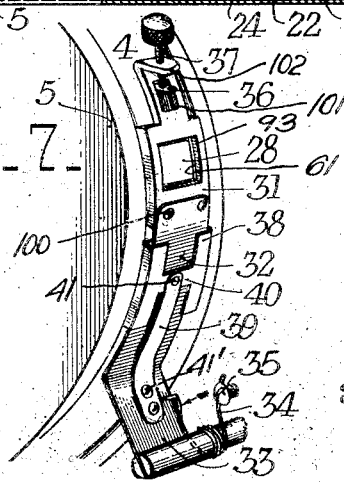

Patented Nov. 12, 1929

1,735,155

UNITED STATES PATENT OFFICE

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK

MOTION-PICTURE PROJECTOR

Original application filed February 20, 1925, Serial No. 10,601. Divided and this application filed December 17, 1927. Serial No. 240,898.

This invention relates to motion picture projectors and more particularly to projectors of a portable type, designed primarily for use by unskilled persons. The objects of the invention in such a projector are ease of loading and operation, lightness, simplicity, compactness, low cost of manufacture, a high pulldown speed, and ease of framing. These objects are attained by the particular arrangement of the several parts, the enclosure of the pulldown mechanism in a housing, the exterior curved surface of which forms a guide for a loop of film, and by other structural features. This application is a division of my application Serial No. 10,601, Feb. 20, 1925 which has matured into Patent 1,672,845, granted June 5, 1928. The above and other objects are further obtained from other details of structures and arrangement more fully described in the following specification and shown in the accompanying drawings, in the several figures of which the same reference characters denote the same parts and in which Fig. 1 is a front elevation of my improved projector.

Fig. 5 is a rear elevation of the projector, the lamp house being shown in dotted lines.

Fig. 6 is a section on line 6—6, Fig. 1.

Fig. 7 is a perspective view showing details of the framing structure.

Figure 1:
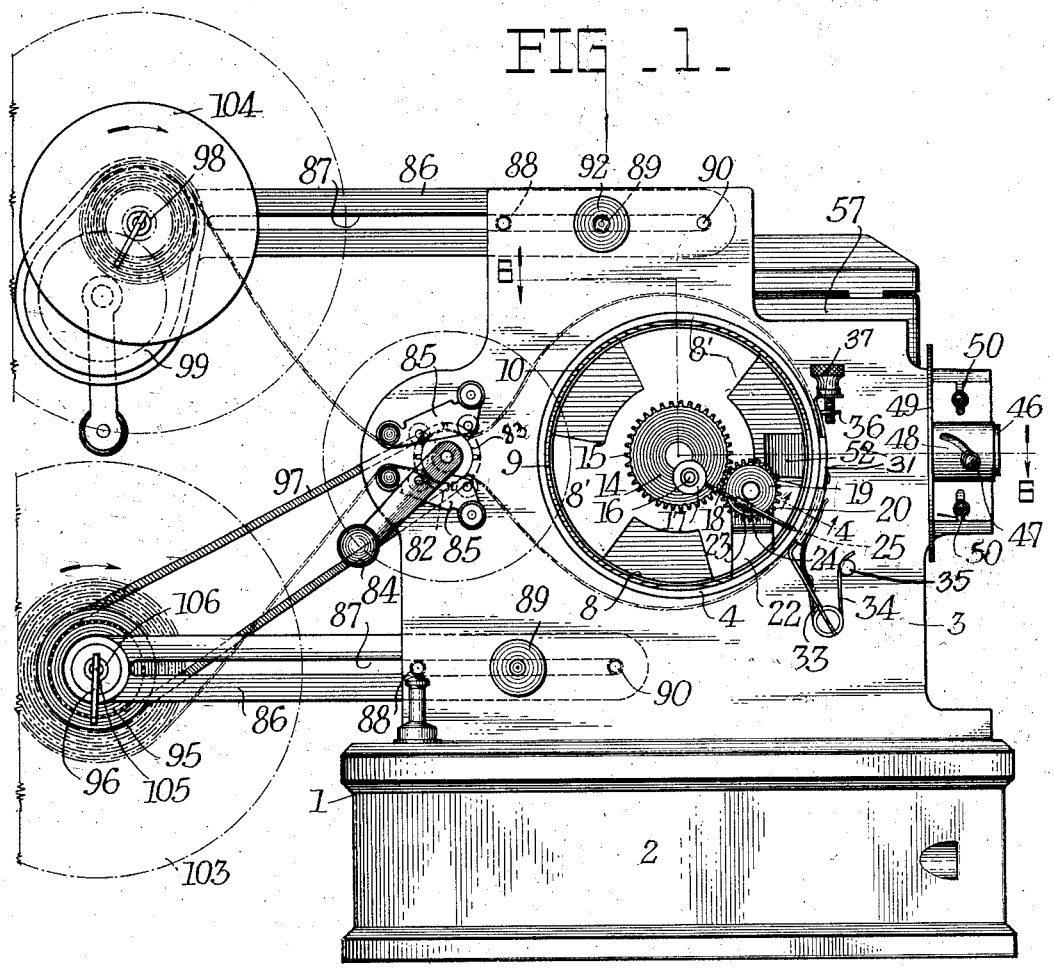
Figure 2:
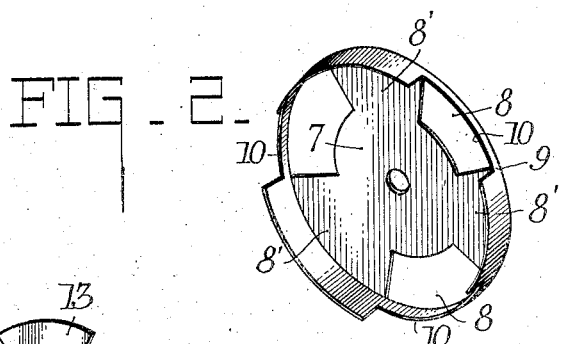
Fig. 2 is a perspective view of one form of shutter.

In the preferred embodiment of my invention herein disclosed, the mechanism is mounted on a suitable hollow base 1, having a slidable door 2, permitting the use of the compartment in the base for the storage of accessories. Upon top of this is a main vertical wall or frame 3, upon one surface of which is rigidly secured a cylindrical housing or container 4, having a suitable cover 5, the cover being shown only in Fig. 6.

Figure 3:
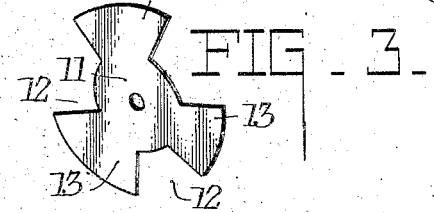
Fig. 3 is a perspective view of a different form of shutter.

A shaft 6 extends through the bushing 6' in frame 3, centrally of the housing 4, and upon this is rigidly mounted a shutter disc 7 having alternate sector openings 8 and leaves 8' and a marginal flange 9 with cut out portions 10 therein registering angularly with the openings 8. In a modified form of my shutter shown in Fig. 3, the flange is omitted and the shutter consists merely of a disc 11, with alternating sector openings 12 and leaves 13.

Upon shaft 6 is also rigidly mounted a disc 14 with peripheral gear teeth 15. Eccentrically mounted on this gear is a trunnion 16 about which is the eye 17 on one end of lever 18. Intermeshing with this gear wheel is a second disc 19 having peripheral teeth 20, and mounted to rotate on trunnion 21 carried by a bracket 22 fixed upon the housing 4. The size of gear 14 is an even multiple of that of gear 19; in this case it has twice the diameter and circumference so that the smaller gear rotates twice for every revolution of the larger gear. Eccentrically mounted on gear disc 19 is a trunnion 23 free to turn therein and carrying a tubular eye or guide 24 within which the lever 18 is slidable. The free end of lever 18 is more or less pointed at 25 and constitutes a film engaging claw.

When the gears are assembled the relative positions of the trunnions 16 and 21 are definitely fixed and the path of the claw determined. It can be altered by removing one of the gears, giving it a partial rotation and re-engaging the gear teeth. The path of the claw crosses the circumference of the housing 4 in a curve and at this place a slot 26 is formed in the housing.

Figure 4:
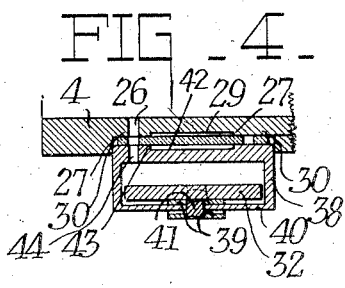
Fig. 4 is a section on line 4—4, Fig. 1.

At this portion of the housing there is formed in its outer convex surface a seat 27 extending from below slot 26 to above the projection window 28. This seat is formed with the usual central concavity 29 and marginal ledges 30, in one of which slot 26 is formed as shown in Fig. 4. Opposite this seat is a bowed presser member comprising the box-like gate member 31 having a window 93 and the bowed sheet metal strip 32 which is riveted thereto at 100. The metal strip 32 is extended at its lower end to engage pintle 33 on frame 3, about which the presser member as a whole may be swung. It is impelled toward its seating position by spring 34 one arm of which engages a fixed lug 35 on frame 3. Slidable within and carried by the gate member 31 is a framing member 61 the framing portion of which is located opposite windows 28 and 93. This has an abutment 36 extending through slot 101 in member 31 which is vertically adjustable by means of screw 37 carried by the lug 102 on member 31. Also carried by the strip 32 is a presser member 38 which is a hollow box-like structure surrounding strip 32 and impened toward the seat 27 by a double spring 39 engaging both sides of its rear wall 40, the springs being attached to 40 by rivet 41, and to 32 at 41'. The front surface of the presser member 38 is normally spring pressed into a position where it forms a smooth curve with the gate member 31 carried by the strip 32, the two parts together fitting nicely around the seat 27 of the housing. It is formed with a central cavity 42 and marginal ledges 43, and has a slot 44 registering with slot 26 for the passage of claw 25.

In line with the window 28 is an objective 45 in mount 46 which is adjustable for focusing by means of a pin 47 engaging a helical slot in the tube 48, which is carried on a support 49 adjustable on the frame 3 by the screw and slot connection 50.

Within the housing 4 the mirror 51 is supported behind the window 8 at an angle of 45° by bracket 52. Opposite this mirror is an opening 53 in frame 3 within which is supported the condenser 54 in mount 55, the mount and opening have a screw thread engagement 56. Behind this is mounted lamp house 57 containing the lamp 58 in line with the condenser.

Shaft 6 extends through the frame 3 and carries in the rear thereof a gear wheel 59 meshing with gears 60 and 62 on stub shafts 63, and 64 respectively. Mounted to swing on shaft 63 and frictionally engaging a hub 65 on gear 60 in a member 66 carrying on one arm 71 a frame 67 with a metal wire screen 68 and on the other arm 72 a counterweight 69 insufficient to completely counterbalance the screen and its frame. When the parts are stationary the screen will fall to the position shown in Fig. 5 where it is in line with the condenser and lamp, its movement being limited by the engagement of the arm 72 with lug 70. When the gear 60 turns in its normal direction indicated by an arrow in Fig. 5, the member is moved by friction between member 66 and the end of hub 65, assisted by the counterweight, so that the screen is lifted from its position in line with the condenser, the movement being limited by arm 72 engaging shaft 6.

Gear 62 meshes with pinion 73 carried on a stub shaft 74 upon which is also mounted a flywheel 75 engaged at its periphery frictionally by driving wheel 76 on shaft 77 of a motor. The motor is not shown but its position is indicated by the dash line 78.

Shaft 64 also carries gear 79 which meshes with gear 80 on shaft 81, which also carries pulley 82 on the rear and a sprocket 83 and a manual driving crank 84 in front of frame 3. Hinged presser members 85 of familiar design hold the film on the sprocket 83 as it is fed to and from the loop of film surrounding housing 4.

Similar reel supports 86 are provided at the top and bottom of frame 3. Each consists of a horizontal bar with a longitudinal slot 87 by which it is slidable over three headed pins. The end pins 88 and 90 act merely as guides and supports. The central pin 89 has heads 91 and 92 at its ends, head 91 engaging in sockets 94 in the rear surface of the support 86 to position the latter in extended or retracted position.

On the outer end of lower support 86 is supported a shaft carrying a pulley 95 and a hinged latch 96 adapted to engage when folded down, the notches 105 in the extended cylindrical core 106 of the film reel 103. It is not intended that this reel will usually be removed from the shaft, and the latch serves primarily to disconnect it from driving relation with the shaft during rewinding. A wire coil belt 97 extending around pulleys 95 and 82 constitutes a friction drive for the reel. The upper support carries a support 98 for a reel of film 104 and a rewinding mechanism 99, the details of which are unimportant.

The relation of the lamp house, shutter and mirror is compact, and permits the use in a projector of a single feed sprocket. The curved gate and cylindrical housing afford a structure permitting the threading of the film with the greatest convenience. The curvature of the gate is not so great as to be objectionable in the optical system, while it is sufficient to prevent lateral buckling and it insures the film being drawn and maintained very exactly in the intended position; and this certainty in the position of the film more than counterbalances any faults introduced by the curvature.

The foraminous metal screen 68 cuts off enough light and heat rays to prevent overheating of the film when the machine is stopped and the light burning, while it conducts away the intercepted heat rays, and permits enough light to pass to project a still picture. It is so removed from the film that it cannot, if it should become itself heated, affect the film by radiation.

It is to be understood that the structures herein disclosed are by way of example and that I contemplate as within the scope of my invention all such modifications and equivalents as fall within the appended claims.

Having thus described my invention what

I claim as new and desire to secure by Letters Patent is,—

1. In motion picture apparatus, two complemental guide members between which a film band may be passed, said guide members being bowed longitudinally, that member whose convex surface is the guiding surface being fixed and the other being spring pressed toward it, one of said members having an exposure window and said members having registered longitudinal passages, and means having a path of movement through said passages to engage and advance the film, both members having uniform curvature past the window and passages.

2. In motion picture apparatus, two complemental guide members between which a film band may be passed, said guide members being bowed longitudinally, that member whose convex surface is the guiding surface being fixed and the other being spring pressed toward it, one of said members having an exposure window and said members having registered longitudinal slots, and mechanism mounted behind the fixed member and including a claw having a path of movement through said slots to engage and advance the film, both members having uniform curvature past the window and slots.

3. In motion picture apparatus, an objective, a fixed, extended, longitudinally bowed film guide behind said objective and convex to said objective, a complementary bowed film guide mounted between said first named guide and the objective and spring pressed toward said fixed guide and having an exposure window therein, said guides having registering longitudinal passages, and means adapted to be moved through said passages to engage and advance the film, both guides having uniform curvature past the window and passages.

4. In motion picture apparatus, an objective, a fixed, extended, longitudinally bowed film guide behind said objective and convex thereto, a complementary bowed film guide having a film exposure window and mounted between said fixed guide and the objective and spring pressed toward said fixed guide, film advancing mechanism including a claw adapted to engage and advance the film, said guides having registering passages in the path of the claw and having uniform curvature past the window and passages.

5. In motion picture apparatus, an objective, a fixed, extended, longitudinally bowed film guide behind said objective and convex thereto, a complementary bowed film guide having a film exposure window and mounted between said fixed guide and the objective and spring pressed toward said fixed guide, film advancing mechanism including a claw adapted to engage and advance the film, said guides having registering passages in the path of the claw and having uniform curvature past the window and passages, said mechanism being positioned behind the fixed guide.

6. In motion picture apparatus, a frame, a cylindrical wall fixed on said frame, an objective mounted on said frame with its axis radial of said cylindrical wall, a film guide member bowed to conform to the exterior surface of the wall and spring pressed against it, said guide having an exposure window in axial alignment with the axis of the objective, film advancing mechanism within the cylindrical wall and including a claw, there being in the wall a slot through which the claw is adapted to be moved to engage and advance the film.

7. In motion picture apparatus, a frame, a cylindrical wall fixed on said frame, a driving sprocket carried by said frame outside of and in line with said wall and means to hold film in engagement with both sides of said sprocket whereby a loop of film may be fed past said sprocket in both directions and around the cylindrical wall, a curved pressure plate adapted to hold the loop of film in contact with the exterior surface of the cylindrical wall and having an exposure window, and means for moving film intermittently past said exposure window.

8. In motion picture apparatus, a frame, a cylindrical wall fixed on said frame, a driving sprocket carried by said frame exteriorly of and in line with said wall and means to hold film in engagement with both sides of said sprocket whereby a loop of film may be fed past said sprocket in both directions and around the cylindrical wall, a curved pressure plate adapted to hold the loop of film in contact with the exterior surface of the cylindrical wall and having an exposure window, said wall having a slot, and film advancing mechanism within the cylindrical wall including a claw having a path of movement through said slot to engage and advance the film.

9. A motion picture projector including a frame, a cylindrical wall fixed on said frame and having an exposure aperture, means for guiding film around said wall and past said aperture, an objective carried by the frame in alignment with said aperture, an obliquely arranged reflector within said wall and behind said aperture, a source of light mounted on the frame at one side of said cylindrical wall and positioned to throw a beam of light upon said reflector and thence, by reflection, through the aperture and objective, and a shutter mounted to rotate within the cylindrical wall and concentric therewith and to intercept the beam of light between the lamp and the aperture.

10. A motion picture projector including a cylinder with a circular wall and a flat end wall, windows in each of said walls, a source of light mounted outside said cylinder in line with the window in the flat wall, a reflector obliquely positioned within the cylinder to direct to the windows in the circular wall rays passing from the light through the window in the flat wall, means for feeding a film in a loop around the outside of said circular wall and means for holding a portion of the loop in contact with the curved cylindrical wall opposite the window therein.

Signed at Rochester, New York, this 12th day of December, 1927.

JOHN G. CAPSTAFF.